March 24, 1970   I. H. COHN   3,501,955
LOAD LIMIT CONTROL

Filed Feb. 23, 1968   2 Sheets-Sheet 1

INVENTOR
IRVING H. COHN

United States Patent Office 3,501,955
Patented Mar. 24, 1970

3,501,955
LOAD LIMIT CONTROL
Irving H. Cohn, Yonkers, N.Y., assignor to Simmonds Precision Products, Inc., Tarrytown, N.Y., a corporation of New York
Filed Feb. 23, 1968, Ser. No. 707,551
Int. Cl. G01f 23/00
U.S. Cl. 73—304          6 Claims

ABSTRACT OF THE DISCLOSURE

A fuel gage circuit includes a bridge circuit having a capacitive fuel tank sensor, a temperature compensating capacitor servo re-balancing means, the servo re-balancing means providing an output representative of a mass of fuel, and a temperature compensated conversion circuit responsive to the re-balancing circuit to provide an output representative of the actual volume of the fuel so as to be able to trigger a volume top-off valve when the fuel tank is full.

---

The present invention relates to volumetric top-off devices, in particular for use with aircraft fuel tanks, which are arranged to shut off a fueling valve when the tanks are full.

Previously proposed volumetric top-off devices incorporate the compensated (profiled) fuel sensors which are normally used for mass gaging so as to provide a signal to a shut off valve when the tank is 100% full regardless of the ramp attitude of the aircraft during the filling of the aircraft tanks.

Such previously proposed systems maybe of the type described in United States Patent Ser. No. 3,338,098 and provide the valve shut-off signal by means of a current transformer which is connected in series with the fuel sensors which form a high impedance and therefore sensitive source.

Such systems however suffer from the disadvantage that, since the current transformer cannot be physically placed only a short distance from the multiplicity of tank sensors usually used in a given fuel tank system, it must be connected by means of co-axial cables to the sensors. The large amount of capacitance to ground in these cables causes the system to become very sensitive to variations, which may be in the form of manufacturing tolerances of this capacitance.

A further disadvantage arises from the fact that the current transformer, when connected in series with the fuel sensors, is itself also in series with a mass gaging circuit which is normally in circuit with the fuel sensors. This results in the volumetric top-off circuit feeding a voltage back into the current transformer so as to cause changes in the mass gage reading when the power in the volumetric top-off circuit is turned on or off.

An object of the present invention is to provide an improved volumetric top-off device which overcomes these disadvantages by the elimination of the current transformer.

Another object is to arrange the volumetric top-off circuit with the mass gaging circuit so that there is generally no interaction between the two, while the fuel sensors remain common to both.

Volumetric top-off devices embodying the invention will now be described, by way of example, with reference to the accompanying drawings in which:

FIGURE 1 shows a modification of the system shown and described in United States Patent Ser. No. 3,338,098 (Gronner et al.), in which the primary winding of a current transformer is placed in circuit with a normal mass gage circuit to provide an input signal for a top-off device.

Figure 1:
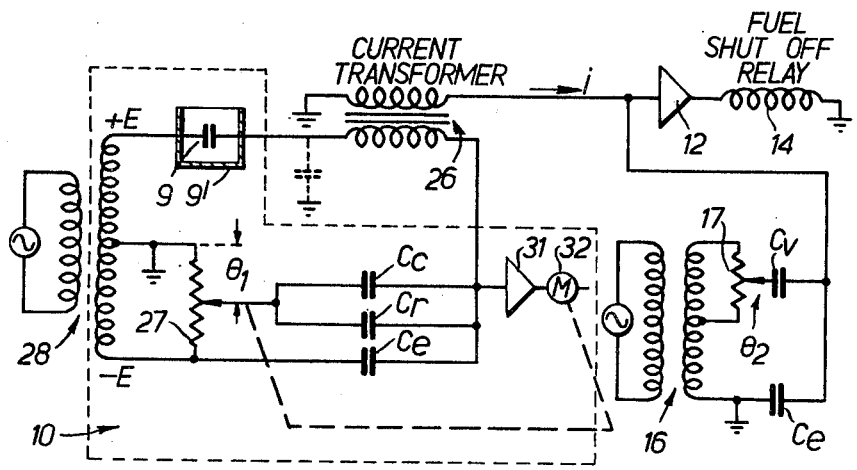
FIGURE 1 is a circuit diagram of a previously proposed top-off device.

Referring now to FIGURE 1 in more detail the mass gage 10 comprises the capacitance sensor or measuring condensor 9 immersed in the fuel tank 9'. One electrode of the condenser 9 is connected to the end terminal of the secondary winding of transformer 28. The secondary winding is provided with a centre tap which is shown connected to ground. A fixed capacitor $C_e$ is connected between the free end terminal of the secondary winding and the input to amplifier 31. A rebalancing potentiometer winding between the centre tap and the last-mentioned terminal. The slider of the potentiometer is connected to a fixed capacitor $C_r$ and to the input of the amplifier 31. Capacitor $C_e$ which is advantageously located in the bottom of the fuel tank 9' is a mass compensator connected in parallel with capacitor $C_r$. The other electrode of the measuring condenser 9 is connected through the primary winding of a current transformer 26 to the input of amplifier 31. The transformer 28 is provided with a primary winding which may be connected to a source of alternating current operating at 400 cycles per second. The output of the amplifier 31 is coupled to a conventional phase rebalancing motor 32 and to the slider of the potentiometer 27. Thus, in the circuit just described if there is any change in the capacity of measuring condenser 9, a signal will be supplied to the motor 32 causing it to re-position the slider of the potentiometer 27 in a direction tending to reduce the signal to zero and rebalance the bridge. It will be seen that the position of a suitable servo indicating pointer, not shown but normally connected to the rebalancing potentiometer 27, will continuously change as the tank capacitor unit senses a fuel increase or decrease thereby indicating the mass of fluid in the tank 9'.

The remainder of the circuit comprises the volumetric top-off circuit. One end of the secondry winding of the current transformer 26 is earthed while the other end is fed to the input of an amplifier 12. The output current $i$ from the current transformer is compared at the input of the amplifier 12 with a reference current provided by an adjustable reference circuit. When the two currents become equal there is no input to the amplifier 12 and a relay 14 which is normally energised by the amplifier 12 becomes de-energised to shut off the fueling valve (not shown).

The adjustable reference circuit includes a transformer 16 having a primary winding which is connected in parallel with the primary winding of transformer 28 to the source of alternating current operating at 400 cycles per second.

The secondary winding is a center tapped winding having an adjustable potentiometer 17 connected between one end and the center tap of the secondary winding. The other end of the secondary winding is earthed. The series combination of a capacitor $C_v$ and a capacitor $C_e$ is connected between the adjustable arm of the potentiometer 17 and earth. The common junction between the two capacitors $C_v$ and $C_e$ is connected to the input of the amplifier 12.

The current $i$ provided by the secondary winding of the current transformer is the raw fuel sensor current and may be written as $$i = E[C_e + VC_e(K-1)] \tag{1}$$

where:

E is the voltage of the secondary winding of the transformer 28;
$C_e$ is the capacitance of the tank sensors when the tank is empty;

K is the dielectric constant of the fuel; and
V is the normalised tank volume.

Figure 2:
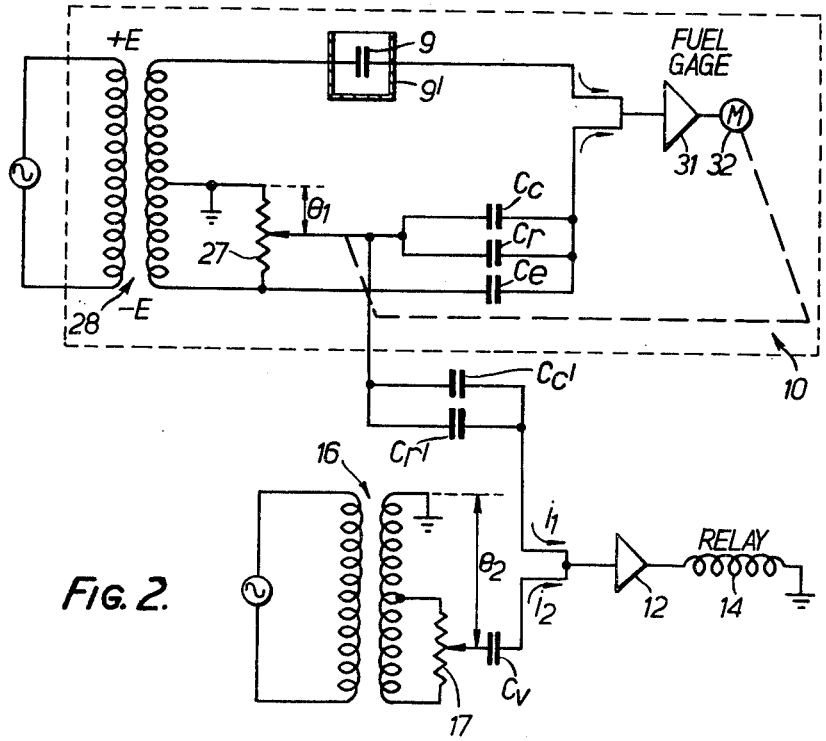
FIGURE 2 is a circuit diagram in accordance with the invention.

Referring now to FIGURE 2 which embodies the present invention, parts similar to phase in FIGURE 1 are similarily referenced.

The mass gage circuit 10 operates in a manner similar to that described in conjunction with FIGURE 1. However, the current transformer has been eliminated and instead an output signal for the volumetric top-off circuit is derived from the movable arm of the potentiometer 27. The voltage provided between earth and this arm may be considered as derived from a low impedance voltage source having an output voltage of $-E.\theta_1$ where $\theta_1$ represents the fraction of the voltage E appearing between the movable potentiometer arm and earth at any instant $E.\theta_1$ can be derived as follows.

Under balanced conditions, the mass gage is governed by the following equation.

$$E[C_e + V.C_e.(K-1)] = E.C_e + E.\theta_1(C_c + C_r) \quad (2)$$

This reduces to $$E.\theta_1 = \frac{E.V.C_e.(K-1)}{C_c + C_r} \quad (3)$$

The output voltage $E.\theta_1$ is fed to an amplifier 12 through the parallel combination of capacitors $C_c1$ and $C_r1$ the latter of which may use the fuel as a dielectric. Thus the current $i_1$ fed to the input of the amplifier 12 is giverned by the following equation.

$$i_1 = \frac{E.V.C_e.(K-1)}{(C_c + C_r)} \times (C_c1 + C_r1) \quad (4)$$

If $C_c$ and $C_r1$ are respective made equal in value to $C_c$ and $C_r$ then $$i_1 = E.V.C_e (K-1) \quad (5)$$

This equation now corresponds to Equation 1 without the constant term $E.C_e$.

Accordingly the adjustable reference circuit of FIGURE 1 is modified and in fact simplified, in FIGURE 2 to provide a reference current $i_2$.

The adjustable reference circuit of FIGURE 2 includes a transformer 16 energised as in FIGURE 1 and having a center tapped secondary winding with one end earthed and with an adjustable potentiometer 17 connected between the other end and the center tap.

The variable arm of the potentiometer 17 is connected in series with a capacitor $C_v$ to the input of the amplifier 12.

The current $i_2$ is governed by the equation $$i_2 = E.\theta_2.C_v \quad (6)$$

where $\theta_2$ represents the fraction of voltage E appearing between earth and the adjustable arm of the potentiometer 17.

Now if $C_v$ by design is made equal in value to $C_c + C_r$ then $$i_2 = E.\theta_2 (C_c + C_r) \quad (7)$$

In order to determine the relationship between $\theta_1$ and $\theta_2$, let us now consider what happens at the moment during the refueling process when the relay 14 operates and the fueling valve is shut off. At this instant $$i_1 = i_2 \quad (8)$$

combining Equations 3 and 5 I obtain $$i_1 = E.\theta_1 (C_c + C_r) \quad (9)$$

Then substituting Equations 7 and 9 into Equation 8

$$(E.\theta_2 (C_c + C_r) = E.\theta_1 (C_c + C_r) \quad (10)$$

so that $$\theta_2 = \theta_1 \quad (11)$$

Therefore shut off occurs when the setting $\theta_1$ of potentiometer 27 reaches the setting $\theta_2$ set on the potentiometer 17.

Figure 3:
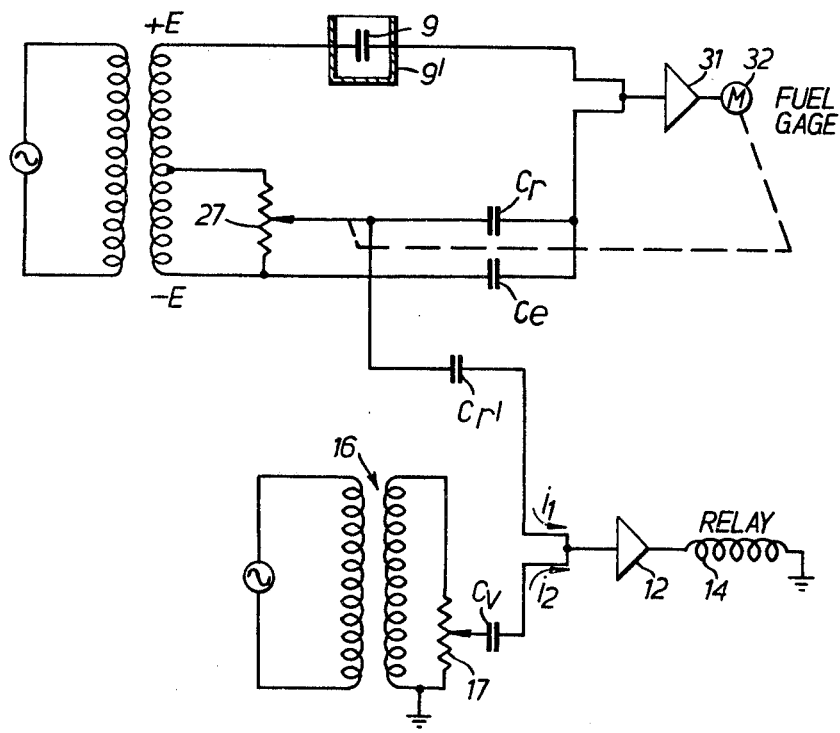
FIGURE 3 is a modified circuit diagram also in accordance with the invention.

FIGURE 3 shows an exponential volumetric top-off control circuit which is a modification of the circuit of FIGURE 2. The mass compensation capacitors $C_c$ have been eliminated, otherwise the circuit is referenced and operates in a similar manner to that described in conjunction with FIGURE 2.

I claim:
1. In a fuel gage bridge circuit,
   fuel tank variable capacitance means having a capacitance variable with the amount of fuel in the tank,
   reference capacitance means, and
   servo bridge-rebalancing means responsive to variations of the capacitance of the variable capacitance means relative to the capacitance of the reference capacitance means for producing a signal according to the position of balance, said reference capacitance means including means whereby said signal from the servo means represents the mass of fuel in the tank, the improvement comprising:
      a compensating means having an input and an output, said input being directly connected to said servo means for receiving said signal from said servo means, said compensating means being operative to produce from said signal a temperature compensated volume signal for representing the volume of fuel in the tank,
      a reference circuit connected to receive a supply voltage and having an output providing an output signal representative of a predetermined volume of said fuel, and
      signal combining means having an input and output of said signal combining means connected to both the output of said reference circuit and the output of said compensating means, the out, put of said signal combining means being zero when the output signal from the reference circuit and said volume signal are equal.

2. A circuit according to claim 1 further comprising fuel shut-off relay means having an energising winding connected to the output of said signal combining means for energisation of said relay means by the output from said combining means.

3. A circuit according to claim 1 wherein said signal combining means is an amplifier.

4. A circuit according to claim 1 wherein said reference circuit comprises impedance means connected to said supply voltage and having a variable tap thereon, and capacitance means having an input and an output, the input of said capacitance means being connected to said variable tap and the output of said capacitance means forming the output of said reference circuit.

5. A circuit according to claim 4 wherein said capacitance means has a capacitive value which over a predetermined range of temperatures is equal to the capacitive value of said compensating means.

6. A circuit according to claim 1 wherein said compensating means comprises a parallel circuit combination of a first capacitor having a predetermined value and a second capacitor having a quantity of said fuel as a dielectric whereby to vary the capacitance thereof in response to temperature variations.

References Cited

UNITED STATES PATENTS 2,651,940  9/1953  Kline.
3,208,280  9/1965  Exon.
3,338,098  8/1967  Gronner et al. _____ 73—304

S. CLEMENT SWISHER, Primary Examiner

U.S. Cl. X.R.

137—392